UNITED STATES PATENT OFFICE 2,069,039

ARYLAMINO-HYDROXYBENZENES

Leopold Laska and Oskar Haller, Offenbach-on-the-Main, and Arthur Werdermann, Frankfort-on-the-Main, Germany, assignors to General Aniline Works, Inc., New York, N. Y., a corporation of Delaware No Drawing. Application July 5, 1935, Serial No. 30,016. In Germany January 20, 1933

3 Claims. (Cl. 260—128)

The present invention relates to condensation products from phloroglucine with primary aromatic amines; more particularly it relates to the manufacture of compounds of the following general formula:

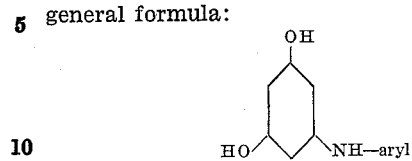

by heating phloroglucine with aromatic amines in the proportion of 1 to 1 in the presence of water and, if necessary, in the presence of acids, in which latter case the formation of triarylaminobenzenes is avoided by suitably choosing the amounts of amines and the acid added, as well as the duration of heating.

This application is a continuation-in-part of our co-pending application Serial No. 707,220, filed January 18, 1934, which has matured into U. S. Patent No. 2,013,182.

We have found that there are obtained from phloroglucine and aromatic amines condensation products which still contain two hydroxy groups of the phloroglucine nucleus, by heating phloroglucine and aromatic amines in the proportion of 1 to 1 in the presence of water. Furthermore, we have found that the condensation of phloroglucine with aromatic amines may also be performed in the presence of a mineral acid. In this case the basicity of the aromatic amine used greatly influences the course of the reaction. The application of acid as condensing agent in the present method of working is advisable in case phloroglucine is to be condensed with amines having substituents of a more strongly negative action. By using a large excess of stronger bases, there are easily formed, in the presence of acid, tri-arylamino-benzenes. By suitably choosing the amounts of such an amine and of the acid added, as well as the duration of the heating, good yields of mono-arylamino-dihydroxybenzenes may be obtained.

The quantity of water which is used for the conversion of the reaction components, according to the present process, may vary within wide limits. In some cases the two mols of water of crystallization which are present in the crystallized phloroglucine are sufficient. The condensation products obtained are valuable intermediates for the production of dyestuffs or other organic compounds. They have, in the form of their alkali metal salts, more or less affinity for the vegetable fiber.

The following examples serve to illustrate the invention, but they are not intended to limit it thereto, the parts being by weight:

(1) 162 parts of phloroglucine (containing water of crystallization) are boiled in 15 times their weight of water with 280 parts of paranitroaniline and 102 parts of hydrochloric acid (specific gravity 1.15) or the equivalent amount of sulfuric acid for 16 hours, while stirring and under reflux. The red powdery magma is extracted several times with boiling dilute sodium carbonate solution. A small quantity of paranitro-aniline which has not been reacted upon precipitates from the combined filtrates after cooling. This is removed by filtration and by acidification with acetic acid, the 1,3-dihydroxy-5-(4'-nitrophenylamino)-benzene separates from the alkaline filtrate in the form of a red powder. It melts at 205° C., dissolves in hot water and dilute sodium carbonate solution. The yield amounts to 39 per cent. of the theoretical (calculated upon the phloroglucine). The residue which is insoluble in the dilute sodium carbonate solution represents, after washing out and drying, 1-hydroxy-3,5-di-(4'-nitrophenylamino)-benzene, being a brick-red powder which melts above 270° C. and dissolves easily in alcoholic caustic soda solution. The yield amounts to 48.6 per cent. of the theoretical (calculated upon phloroglucine).

In the manner described in the foregoing example there is obtained from phloroglucine and 5-nitro-2-aminomethylbenzene the 1,3-dihydroxy-5-(4'-nitro-2'-methylphenylamino)-benzene, being a red-brown powder which melts at 241° C. besides the 1-hydroxy-3,5-di-(4'-nitro-2'-methylphenylamino)-benzene, being a red-brown powder which melts at 280° C.

(2) 32.4 parts of phloroglucine (containing water of crystallization) are boiled under reflux with 60 parts of 2,4,5-trichloroaniline, 500 parts of water and 6.4 parts of sulfuric acid of 95 per cent. Strength for 54 hours. The mixture is then rendered alkaline by means of caustic soda solution and the excess of 2,4,5-trichloroaniline is blown off with steam. After cooling, the filtrate separates on acidification with acetic acid the 1,3-dihydroxy-5-2′,4′,5′-trichlorophenylamino)-benzene. The product forms a feebly yellow colored powder which melts at 170° C. (uncorrected).

In the same manner there is obtained from phloroglucine and 2,5-dichloroaniline the 1,3-dihydroxy-5-2′,5′-dichlorophenylamino)-benzene which is easily soluble in alkalies and melts at 205° C.

We claim:

1. The compounds of the general formula:

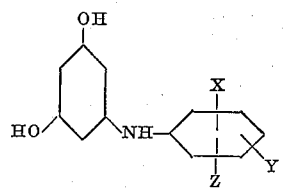

wherein X stands for one of the group consisting of hydrogen, methyl and chlorine, Y for one of the group consisting of hydrogen, nitro and chlorine and Z for one of the group consisting of hydrogen and chlorine.

2. The compound of the following formula:

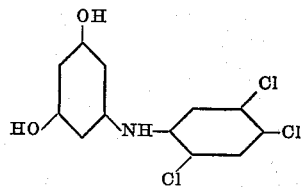

being a feebly yellow-colored powder, melting at 170° C.

3. The compound of the following formula:

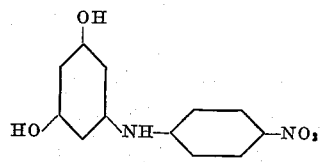

being a red powder, melting at 205° C. and dissolving in hot water and dilute sodium carbonate solution.

LEOPOLD LASKA.
OSKAR HALLER.
ARTHUR WERDERMANN.